United States Patent
Koure et al.

(10) Patent No.: US 9,499,287 B2
(45) Date of Patent: Nov. 22, 2016

(54) TRAY GRIPPER HEAD

(71) Applicant: Moba Group B.V., Barneveld (NL)

(72) Inventors: Mender Koure, Arnhem (NL); Bart Van Walderveen, Soesterberg (NL)

(73) Assignee: MOBA GROUP B.V., Barneveld (NL)

( * ) Notice: Subject to any disclaimer, the term of this patent is extended or adjusted under 35 U.S.C. 154(b) by 29 days.

(21) Appl. No.: 14/350,712

(22) PCT Filed: Oct. 10, 2012

(86) PCT No.: PCT/NL2012/050705
§ 371 (c)(1),
(2) Date: Apr. 9, 2014

(87) PCT Pub. No.: WO2013/055211
PCT Pub. Date: Apr. 18, 2013

(65) Prior Publication Data
US 2014/0255141 A1    Sep. 11, 2014

(30) Foreign Application Priority Data
Oct. 10, 2011  (EP) .................................... 11008164

(51) Int. Cl.
| | | |
|---|---|---|
| *B65B 23/08* | (2006.01) | |
| *B65B 23/02* | (2006.01) | |
| *B65G 47/90* | (2006.01) | |
| *B65G 47/91* | (2006.01) | |
| *B65G 59/04* | (2006.01) | |

(52) U.S. Cl.
CPC .............. *B65B 23/08* (2013.01); *B65B 23/02* (2013.01); *B65G 47/90* (2013.01); *B65G 47/91* (2013.01); *B65G 59/04* (2013.01); *B65G 2201/0208* (2013.01)

(58) Field of Classification Search
CPC .... B65G 47/90; B65G 47/91; B65G 47/918; B65G 59/04; B65G 2201/0208; B65B 23/02; B65B 23/08
USPC ................. 294/2, 65, 87.12; 414/796.9, 797, 414/795.6, 798.4
See application file for complete search history.

(56) References Cited

U.S. PATENT DOCUMENTS 2,658,789  A  *  11/1953  Tellier ........................... 294/184
4,079,845  A  *   3/1978  Warren ....................... 414/796.3

(Continued)

FOREIGN PATENT DOCUMENTS

| FR | 2 330 619 | 6/1977 |
| NL | 8 302 210 | 1/1985 |

OTHER PUBLICATIONS

International Search Report for PCT/NL2012/050705 dated Jan. 31, 2013.

*Primary Examiner* — Dean Kramer
(74) *Attorney, Agent, or Firm* — Marvin Petry; Stites & Harbison PLLC

(57) ABSTRACT

A method and device for unstacking a stack of trays, each tray having pockets and edge portions. A holder frame above the stack has suction heads which engage the eggs of the uppermost tray of the stack. A carrier unit above the holder frame has oppositely opposed grippers which engage sides of the uppermost tray. The holder frame is connected to the carrier unit by one or more spacer rods which are freely moveable in a channel in the carrier unit so as to permit three degrees of movement relative thereto. The carrier unit may also be moveably suspended in a second carrier unit above it. Support rods may extend downwardly from the carrier unit to engage the tray.

30 Claims, 2 Drawing Sheets

(56) References Cited

U.S. PATENT DOCUMENTS

Figure 1:
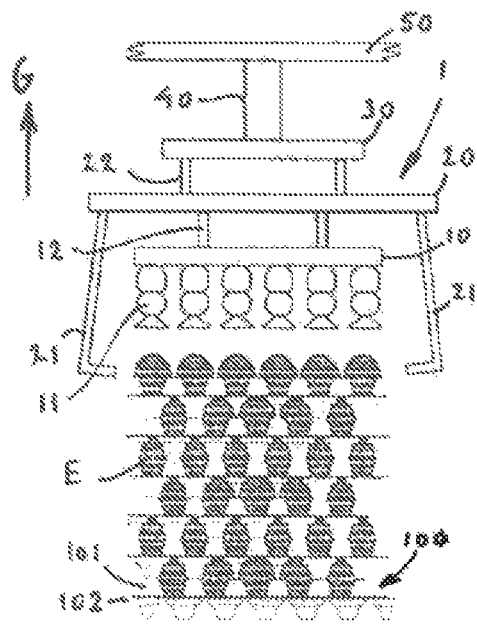

| | | | |
|---|---|---|---|
| 4,293,272 A * | 10/1981 | Jellema | 414/744.5 |
| 4,355,936 A | 10/1982 | Thomas et al. | |
| 4,909,412 A * | 3/1990 | Cerf | 221/1 |
| 4,960,298 A * | 10/1990 | Moroi | 414/627 |
| 5,112,181 A | 5/1992 | Rasmussen | |
| 5,352,086 A * | 10/1994 | Mank | 414/797 |
| 2008/0310947 A1* | 12/2008 | Trygg | 414/788.1 |
| 2009/0320417 A1 | 12/2009 | Gilmore | |
| 2012/0048681 A1 | 3/2012 | Neutel | |

* cited by examiner

TRAY GRIPPER HEAD

The present invention relates to a gripper head for engaging and picking up a tray loaded with eggs. In particular, the invention relates to a gripper head for unstacking a stack of trays, each tray provided with a relief of pockets with edge portions and loaded with eggs, the gripper head provided with a holder frame, having included therein a matrix of suction heads, with the suction heads, during pickup, transfer and deposition of one tray, being placed on the eggs and engaging them with suction, having connected therewith at least two oppositely arranged grippers for engaging, simultaneously with the eggs, the tray at corresponding sides during pickup, transfer and deposition of the tray, and having at least a mast piece which extends perpendicularly with respect to the matrix and is connected with at least an arm for displacing the gripper head between a take-up location and a delivery location.

A gripper head of this kind is known from, e.g., U.S. Pat. No. 4,355,936. In this patent publication it is described in a clear manner how a stack of egg trays is unstacked. To this end, a take-off cycle is followed whereby each time a next tray loaded with eggs is picked up. For pickup, the eggs are each subjected to suction with a suction cup, and thereby taken hold of, and at the same time two opposite edges of a respective tray are engaged with claws. The usual asymmetry in the tray, viz., the 5×6 patterns, as well as the trays being stacked successively rotated through 90°, is accommodated either through the possibility of rotating the gripper head or through the possibility of rotating the stack support, e.g., a rotary platform. More particularly, the gripper head comprises a frame having suction cups in the 5×6 pattern, which is placed with an arm on a loaded tray, while the frame upon vertical placement with a slightly springing rod-tube mechanism can move in vertical direction. Thus, trays with both larger and smaller eggs can be taken up from vertically aligned stacks, transferred, and deposited without damage.

The above situation of vertically aligned stacks is only rarely involved. Accordingly, it will regularly happen that clue to skewed alignment of head and trays, eggs are damaged, or even whole trays may fall down and be lost, especially in the case of trays not made of carefully dimensioned plastic but made of pulp or paperboard.

To make the above situations better manageable, the gripper head according to the present invention is characterized in that the gripper head furthermore comprises a carrier unit which is connected through at least one spacer with the holder frame in a carrying manner, movably in at least three degrees of freedom.

With great advantage, it is now possible to unstack skewed stacks of trays without products being lost in the process. It has been found that with this sole measure, differences in height between the longitudinal sides of as much as 10 cm can be bridged.

Furthermore, with great advantage, stacks of many different types of trays and loaded with non-uniform products can be reliably processed in this manner without loss or damage.

Further embodiments of this gripper head have one or more of the following features:
that the spacer comprises a rod
 which extends in the pickup direction, and
 which is freely movable through a fitted hole in a plate body of the carrier unit, the plate body extending perpendicularly to the mast piece;
that the spacer is fixedly connected with the holder frame;
that on at least each of two opposite sides of the carrier unit, at least one support extends in the direction of a spacer, while at pickup the support finds a point of support on a corresponding edge portion of the relief of the respective tray;
that the gripper head comprises a second carrier unit, which is connected through at least one second spacer with the first carrier unit in a carrying manner, movably in at least three degrees of freedom;
that the second spacer comprises a rod
 which extends in the pickup direction, and
 which is freely movable through a fitted hole in a plate body of the second carrier unit, the plate body extending perpendicularly to the mast piece;
that the spacer is fixedly connected with the holder frame;
that the mast comprises its own length adjustment device;
that the length adjustment device comprises a linkage;
that connected with at least two oppositely arranged grippers is a push-off element for pushing off a subjacent tray at pickup, whereby only the tray to be picked up is engaged and picked up;
that the push-off element is connected with such a gripper so as to be substantially downwardly slidable; and
that the push-off element at its upper end is further pivotably connected for engaging and picking up a next subjacent tray upon sliding out and pivoting of this push-off element.

Advantageously, such a gripper head with level-wise ("tiered") adjustment possibilities can handle many types of stacks composed of a great multiplicity of types—up to as many as 600 types—of marketed and used trays.

Figure 2:
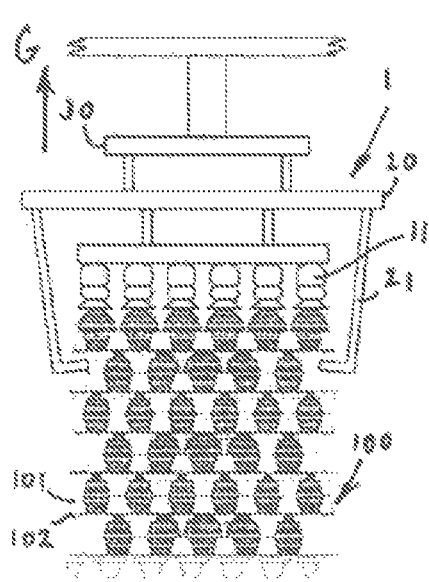
Figure 3:
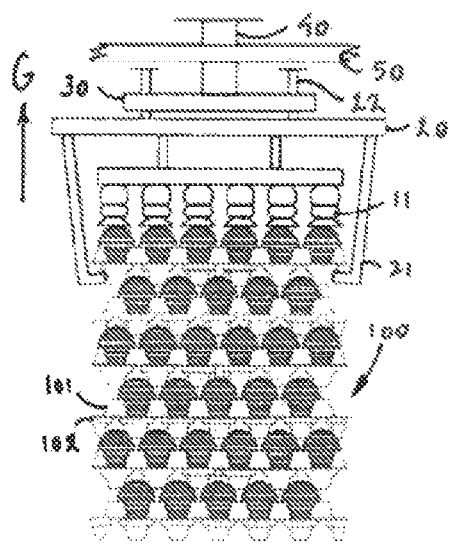
Figure 4:
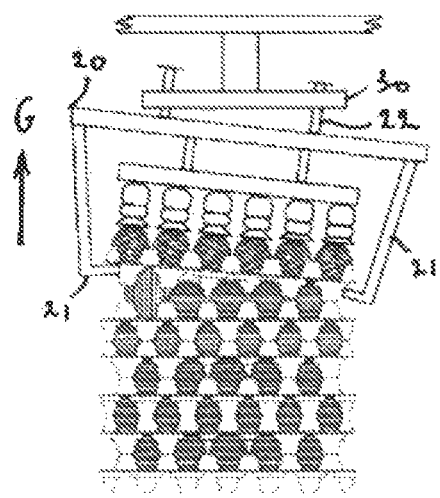
Figure 5:
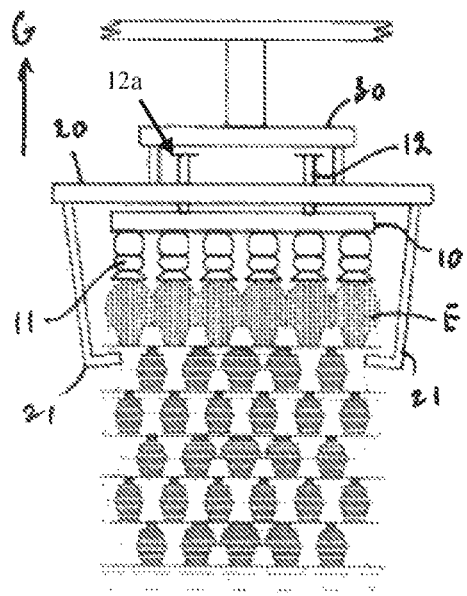
Figure 6:
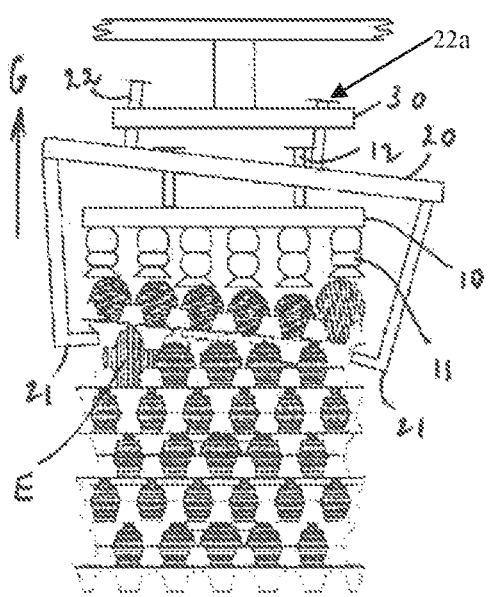
Figure 7:
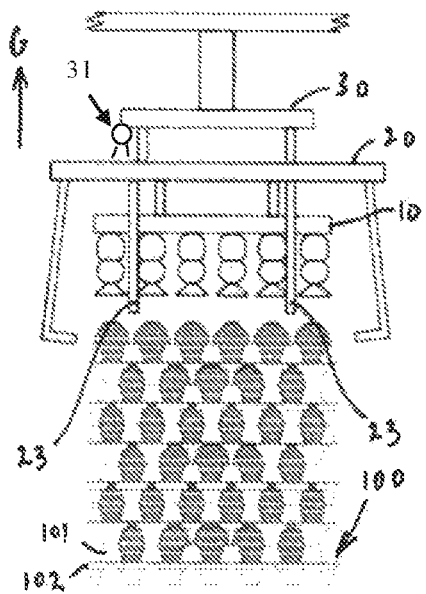
Figure 8:
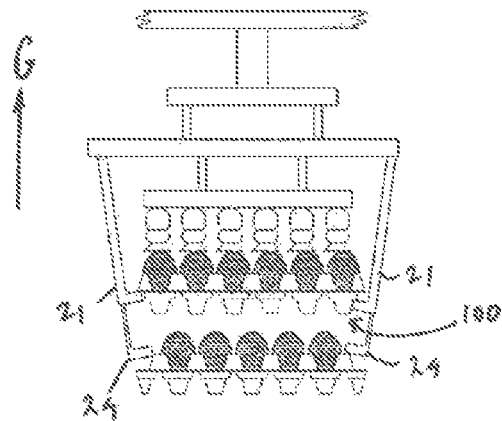

Below, details of an example of a gripper head according to the invention will be elucidated with reference to the appended drawings, in which FIG. 1 is a schematic elevational view of an exemplary embodiment of the gripper head in the situation prior to pickup of a tray, FIG. 2 is a similar elevational view at the moment of engagement of a tray, FIG. 3 is an elevational view similar to FIG. 2 representing an instance of trays loaded with large eggs, FIG. 4 is a similar elevational view representing engagement of a tray stacked askew, FIG. 5 is an elevational view representing pickup of a tray which as an uppermost tray is loaded with large eggs, FIG. 6 is an elevational view representing the situation of a tray which is askew and is loaded with eggs of different size, FIG. 7 is a similar elevational view of a second exemplary embodiment, and FIG. 8 is a similar elevational view of a third exemplary embodiment of a gripper head according to the invention.

In all Figures, the stack is conceived of as sitting on a supporting surface. In the several Figures, the same parts, components, and denotations are numbered and marked in the same manner.

In FIG. 1 a schematic elevational view of a first exemplary embodiment of a gripper head 1 according to the present invention is shown. With this gripper head 1 a stack of trays 100 is unstacked. In the case represented here, such a tray 100 has a tray relief 101 of pockets with edge portions, in which products E, such as, for example, eggs, find a collecting and transport position. Conventionally, such trays 100 are of the type having patterns of 5×6 positions. Stacks of such trays 100 are generally made up of trays consecutive in a height direction, rotated 90° relative to one another, so that the elevational view of FIG. 1, and the elevational views of the other Figures, present 5, or 6, products E. Furthermore, such a tray 100 has a tray edge 102, extending throughout the perimeter in most cases, which conventionally offers support in pickup, manually or with a gripper, in this case gripper head 1.

The situation represented in FIG. 1 should be regarded as the initial position for such a gripper head 1. Such a gripper head 1 comprises, as is customary, a mast or mast piece 40, which mast in turn is connected, for example, to an arm, in particular a robot arm. In this initial situation, this mast 40 is directed substantially vertically and the gripper head 1 is suspended above a stack, whereupon the gripper head 1 starts to move downwards in vertical direction towards the stack and proceeds to engage an uppermost tray 100.

More in detail, gripper head 1 comprises: a holder frame 10, suction heads (i.e., suction cups) 11, at least two oppositely arranged grippers 21, and the mast (i.e., mast piece) 40 referred to. The holder frame 10 is provided with the suction cups 11. These suction cups 11 are placed such that a pattern is formed that corresponds to the patterns of products to be picked up, such as the above-mentioned pattern of 5×6 positions. Not represented in this schematic view is an air suction system having, for example, a single air tube to the holder frame 10 in which a manifold system may be accommodated.

Further, while in this connection reference is made to air, this could also be a different gas, or air with added components or with an excess of partial gases. Also, in this FIG. 1 these suction cups are represented in a non-energized situation.

Fixedly mounted on the holder frame 10 are first spacers 12, by which the holder frame 10 is suspended freely in a first carrier unit 20. At will, this may involve a single first spacer 12 but also a plurality of them.

For example, these spacers 12 consist of a tubular material piece which extends through a just slightly wider channel, hole, or fitted hole in the first carrier unit 20 and has, for example, a ring or plate-shaped upper end overlying the hole or channel, and is thus in a suspended position as represented in FIG. 1. Such a suspension allows a movement in three directions or degrees of freedom when at pick-up the load is at a different level and/or is skew. The spacers may take any different shape and may consist of solid or tubular material, and for convenience the spacers may be referred to at times as spacer rods. Another way of describing the three degrees of freedom is that the spacer rods 12 are freely moveable in channels in the first carrier unit 20, which channels are wider than their respective spacer rods, such that the spacer rods are moveable vertically in their channels. Each spacer 12 may be provided with a supporting element 12a (see FIG. 5) arranged, for example, near or at an upper end, to be supported on an upper side of the first carrier unit 20, in particular when the spacer 12 is in a downward initial position (as in FIG. 1).

Further connected with the first carrier unit 20 are the grippers 21. These are implemented in a known manner as plates or also as forks, having inwardly bent ends for the purpose of engagement. Also, it is generally known in what way such grippers 21 can pivot about their upper end, for example, pneumatically. In their gripping position, these grippers 21 will engage at two lateral sides under the edges 102 of a tray. Also, it is possible to arrange grippers 21 along all four sides.

With the construction described so far a difference in height of between 0 and about 10 cm can be accommodated and bridged.

In FIG. 1 there is further shown a second carrier unit 30 which, with the first carrier unit 20 arranged under it and second spacers 22 fixedly connected thereto, provides a similar type of suspension. With this suspension too, differences in height and skewed positions can be similarly compensated and accommodated. To those skilled in the art it will be clear that this second suspension is an extension with respect to the first suspension with the first spacers 12. To those skilled in the art it will be clear that, at will, a combination of such carrier units 20, 30, thus offering a combined height bridging, or no such combination may be applied.

It is noted that each second spacer 22 may be provided with a supporting element 22a (see FIG. 6), arranged, for example, near or at an upper end, to be supported on an upper side of the second carrier unit 30, in particular when the second spacer 22 is in a downward initial position (as in FIG. 1).

Further, in FIG. 1, a mast 40 is indicated, which connects the gripper head 1 with a manipulator, for example, a robot, more particularly, a robot arm as already mentioned above, or also a guide frame which can displace the mast 40 in a limited number of directions.

For this mast 40, further, a length adjustment device, or also height adjustment device, or mast telescope 50 is indicated. In the exemplary embodiment shown here, the intention is for the mast to be moved with this mast telescope 50 only in the direction of this mast itself. For example, for picking up, a pickup direction G is indicated which is envisaged as being substantially in the vertical direction. To those skilled in the art, it will be clear that several length adjustment devices are possible, such as the telescope mentioned. Also, a generally known linkage or linkage construction can be applied.

In the situation according to FIG. 1, given a vertical position of the mast 40, the gripper head 1, with the carrier units 20, 30 and with the freely suspended spacers 12, 22 (in particular, supported via respective supporting elements 12a, 22a on the carrier units 20 and 30, respectively) will hang vertically. As soon as the gripper head 1 lowers onto a stack and then comes down to some extent, these spacers 12, 22, as a result of the reaction force of such a stack, will permit a vertical movement of the gripper head 1 in substantially the vertical direction upwards, the pickup direction G.

To those skilled in the art it will be clear that movably carrying parts for all possible distances and directions can also be offered with active energization, in lieu of freely suspended spacers 12, 22, for example, a combination of pneumatic, hydraulic, or electric energization and a ball joint; many further combinations may be assumed known in this field of technology.

With the combination of movements of the carrier units 20, 30 and of the mast telescope 50, it is possible, if necessary, to bridge heights of up to a few tens of centimeters. The necessity for this will be determined by the type of trays and the type of product, other than, for example, eggs, e.g., fruits such as apples, or vegetables such as sweet peppers.

With reference to FIGS. 2 to 8 further positions and situations for the gripper head 1 according to this invention will now be described.

In FIG. 2 it is intended to pick up the stack according to FIG. 1. It is indicated how the gripper head 1 has been brought down, the suction cups 11 have been placed, with application of suction, on the products or eggs E, and the grippers 21 have been pivoted and engage at the underside of the tray edge 102 of the uppermost tray 100 of this stack. In the situation represented here, the relative positions of the carrier units 20, 30 are substantially unchanged.

FIG. 3 shows a stack of trays 100 all having relatively large products or eggs E, so that the trays 100 in this stack no longer rest directly on one another by their relief 101. It is indicated that in this situation the suction cups 11 are on the eggs while applying suction, the grippers 21 again engage the uppermost tray 100 at the bottom edge 102, and now mainly the first carrier unit 20 with spacers 22 has moved up, these spacers 22 having also moved upwards with respect to the carrier unit 30. In addition, the mast telescope 50 has been caused to move, to bridge the height in a suitable manner there too.

To those skilled in the art it will be clear that after pickup and transfer of this tray 100, the carrier units 20, 30 will return to the freely suspended situation again, while the mast telescope 50 will move back to its initial position again. It is noted that such a mast telescope 50 can be pushed in slowly under the influence of a frictional force and likewise can settle back into its initial position, but that an active energization or drive, for example, pneumatic, hydraulic, or electric, can also be used.

The situation as in FIG. 3, now for large products or eggs E, is comparable to that for trays 100 having a high relief 101.

In FIG. 4 the pickup of a tray 100 from a skewed stack is shown. As indicated in FIG. 4, the skew of this stack is due to, for example, a large product or egg E. Also in this situation, the first carrier unit 20 has moved in its entirety with respect to the second carrier unit 30, but, unlike in FIG. 3, also in the skew direction. Also, the suction cups 11 are on the eggs E while applying suction and the grippers 21 engage the uppermost tray 100 at the lower edge 102.

FIG. 5 shows a stack of trays 100 of which the uppermost tray is loaded with particularly large eggs E. In this situation the holder frame 10 has moved up with respect to the first carrier unit 20. The suction cups 11 are again on the eggs E while applying suction. The grippers 21 again engage the uppermost tray 100 at the lower edge 102.

In FIG. 6 a situation is represented where several trays 100 of a stack are skewed with respect to one another, for example, because of a few large eggs E. In this situation the carrier units 20, 30, and also the holder frame 10, are displaced with respect to one another from their initial positions. Further, it is indicated that in such a situation engagement by suction will be different for eggs E of different size.

A further exemplary embodiment is shown in FIG. 7. Further supports 23 are indicated which are so positioned that upon suction with the suction cups 21 they end up precisely on an edge portion of the tray relief 101. Such edge portions constitute the edges of the pockets in which the eggs E are placed. These supports 23 are fixedly connected with the first carrier unit 20. An important advantage of such supports 23 is that in this manner the tray 100 to be picked up is always positioned in the same way with respect to this carrier unit 20 and therefore also the grippers 21 will always be pivoted into the proper position with respect to the lower edge of this tray 100. In this way, failure of pickup of a normal, intact tray 100 is substantially completely prevented. In the schematic elevational view according to FIG. 7 two supports 23 are shown. To those skilled in the art it will be clear that the positions and numbers of such supports may be chosen and used as desired.

Yet another exemplary embodiment of the gripper head 1 according to the present invention is shown in FIG. 8. In it, grippers 1 are shown which are themselves provided with slide-out push-off elements 24. With these push-off elements 24 a subjacent tray 100 which for some reason is caught on the tray 100 to be picked up, can be pushed off or detached so that only the tray 100 to be picked up is engaged and picked up. After pickup by the gripper head 1 and the moving away of the gripper head 1 from the remaining stack, the push-off elements 24 can be slid in again. To those skilled in the art it will be clear that there are many solutions for implementing and moving such push-off elements 24, among which a pneumatic drive.

As is apparent from the preceding discussion, the first carrier unit, in which the holder frame is movably suspended through at least one spacer, the suspension allows movement in at least three degrees of freedom, including pivoting movement about two orthogonal axes and vertical translation movement.

According to a further elaboration the gripper head 1 is provided with at least one sensor 31, in particular to detect a relative position of, and/or distance or displacement between, the first carrier unit 20 and the second carrier unit 30, and, for example, to generate a sensor signal related to a detected position and/or detected distance or displacement. Such a sensor 31 is schematically drawn-in in FIG. 7. The sensor 31 may be implemented in different manners, and can comprise, for example, an electric sensor, magnetic sensor, optical sensor, mechanical sensor, or other type of sensor.

According to a non-limiting example, for instance, on the second carrier unit 30 such a sensor 31 may be mounted, which is configured to detect the presence of the first carrier unit 20, in particular to detect a mutual distance and/or displacement between those units 20, 30. The at least one sensor may also be mounted, for example, on the first carrier unit 20, or—in parts—on both units 20, 30.

According to a further elaboration, the sensor 31 is configured to detect an (in particular, upward) displacement of the first carrier unit 20 relative to the second carrier unit 30, for example, during a descending movement of the gripper head and upon initial lift by the rods 23 (when these come into contact with a subjacent object, for example, a tray relief 101). Thus, a stack height can be marked at which the uppermost tray is situated. This information can be used to determine whether a descending movement (of the gripper head 1) has to be completed. If the stack is measured as being too high, the gripper head movement can be discontinued to prevent damage to the machine and the eggs.

When the uppermost tray has been gripped, and the head 1 moves up, a sensor signal supplied by the at least one sensor 31 can be used to determine at which moment exactly the uppermost tray is lifted clear of the stack 1. This information can be used to switch on the push-off elements 24, if present, so that the timing thereof is always right, independently of the stack height.

It is noted that if work is done without a sensor, a push-off element switching moment may be determined, for example, by a control, while use can be made of a fixed switching moment, which, for example, does not depend on a height position of the tray to be picked up.

To those skilled in the art it will be clear that the invention is not limited to the exemplary embodiments described. It will be clear that various modifications and variants are possible within the scope of the appended claims.

Thus, for example, instead of a single tray, a partial stack of for example, 2 or 3 trays as an upper portion of the stack may be engaged and picked up. Also, it is possible to implement the push-off elements as a second set of grippers so that these have a double function.

Also, more than two push-off element/gripper combinations may be used.

In such combinations the push-off element will have to be able to follow not only a sliding movement, but also, just like the gripper, an active pivotal movement.

The invention claimed is:

1. A method for unstacking a stack of trays,
wherein each tray is provided with a relief of pockets with edge portions and loaded with eggs,
wherein a matrix of suction heads engages the eggs of an uppermost tray of the stack,
wherein at least two oppositely arranged grippers engage sides of the uppermost tray,
wherein a gripper head comprising the suction heads is moved between a take-up location and a delivery location,
wherein use is made of a configuration comprising a first carrier unit in which a holder frame is movably suspended through at least one spacer, the suspension allowing movement of the suction heads in at least three degrees of freedom, and
wherein the gripper head comprises a second carrier unit in which the first carrier unit is moveably suspended through at least one second spacer rod, the suspension allowing movement in at least three degrees of freedom.

2. A method according to claim 1, wherein a relative position, distance and/or displacement between the first carrier unit and the second carrier unit is detected.

3. A method according to claim 1, wherein during pickup of a tray the suspension allows movement of the first carrier unit from a first unskewed position of the first carrier unit to a second skewed position of the first carrier unit.

4. A method according to claim 3, including compensating for a skewed tray position.

5. A gripper head for unstacking a stack of trays, each tray provided with a relief of pockets with edge portions and loaded with eggs, the gripper head provided with a holder frame,
having included therein a matrix of suction heads, the suction heads, during pickup, transfer and deposition of one tray, being placed on the eggs and engaging them with suction,
having connected therewith at least two oppositely arranged grippers for engaging, simultaneously with the eggs, the tray at corresponding sides during pickup, transfer and deposition of the tray, and
having at least a mast piece which extends perpendicularly with respect to the matrix and is connected with at least an arm for displacing the gripper head between a take-up location and a delivery location,
the gripper head furthermore comprises a first carrier unit in which the holder frame is movably suspended through at least one spacer, the suspension allowing movement in at least three degrees of freedom, and
wherein on at least each of two opposite sides of the first carrier unit, at least one support extends in the direction of a spacer, while at pickup the support finds a point of support on a corresponding edge portion of the relief of the respective tray.

6. A gripper head for unstacking a stack of trays, each tray provided with a relief of pockets with edge portions and loaded with eggs, the gripper head provided with a holder frame,
having included therein a matrix of suction heads, the suction heads, during pickup, transfer and deposition of one tray, being placed on the eggs and engaging them with suction,
having connected therewith at least two oppositely arranged grippers for engaging, simultaneously with the eggs, the tray at corresponding sides during pickup, transfer and deposition of the tray, and
having at least a mast piece which extends perpendicularly with respect to the matrix and is connected with at least an arm for displacing the gripper head between a take-up location and a delivery location,
the gripper head furthermore comprises a first carrier unit in which the holder frame is movably suspended through at least one spacer, the suspension allowing movement in at least three degrees of freedom, and
including a second carrier unit, in which said first carrier unit is moveably suspended through at least one second spacer, the suspension allowing movement in at least three degrees of freedom.

7. A gripper head according to claim 6, wherein said at least one second spacer comprises a rod which extends in the pickup direction, and which is freely movable through a fitted hole in a plate body of the second carrier unit, the plate body extending perpendicular to the mast piece.

8. A gripper head according to claim 7, wherein the at least one second spacer is fixedly connected with the holder frame.

9. A gripper head according to claim 6, including at least one sensor provided to detect a relative position and/or distance and/or displacement between the first carrier unit and the second carrier unit.

10. A method of unstacking a stack of trays which contain eggs, comprising the steps of:
engaging the eggs of the uppermost tray of the stack with a matrix of suction heads on a holder frame, wherein the holder frame engages a carrier unit located above the holder frame by means of at least one spacer which passes through a hole in the carrier unit which is wider than the spacer, such that the holder frame can move vertically relative to the carrier frame,
engaging the uppermost tray with grippers which are connected to and extend downwardly from the carrier unit, and
including securing the top tray in position, while being picked up, by support rods which extend down from the holder frame, parallel to the said spacer to engage the uppermost tray.

11. A method according to claim 10, wherein the relative movement between the holder frame and the carrier unit allow the grippers to grip the uppermost tray even if that tray is skewed from the horizontal.

12. A method according to claim 10, including the step of pushing off the tray below the uppermost tray while picking up the uppermost tray.

13. A gripper head for unstacking a stack of trays, each tray provided with a relief of pockets with edge portions and loaded with eggs, the gripper head provided with a holder frame, comprising;

a matrix of suction heads which engage the eggs on the uppermost tray, at least two oppositely arranged grippers for engaging the tray at corresponding sides, a first carrier unit which is connected through at least one first spacer with said holder frame so as to be movable in at least three degrees of freedom, and a second carrier unit in which the first carrier unit is moveably suspended through at least one second spacer, the suspension allowing movement in at least three degrees of freedom.

14. A gripper head according to claim 13, wherein the at least one first spacer is fixedly connected to the holder frame.

15. A gripper head according to claim 13, wherein on opposite sides of the first carrier unit, at least one support rod extends downwardly, while at pickup, to engage a corresponding edge portion of the respective tray.

16. A gripper head according to claim 13, wherein the at least one first spacer is freely moveable through a channel and a plate body in the holder frame.

17. A gripper head according to claim 13, wherein the at least one second spacer is freely moveable through a channel and a plate body in the second carrier unit.

18. A gripper head according to claim 17, wherein the at least one second spacer is fixedly connected with the first said carrier unit.

19. A gripper head according to claim 13, including at least one sensor which detects a relative position and/or distance and/or displacement of the first carrier unit and the second carrier unit.

20. A gripper head according to claim 13, including a mast piece which extends perpendicularly with respect to the matrix and is connected with at least an arm for displacing the gripper head between a take-up location and a delivery location, and wherein the mast piece includes a length adjustment device.

21. A gripper head according to claim 13, wherein a push-off element for pushing off a sub-adjacent tray at pick-up is connected to at least two oppositely arranged grippers, whereby only the tray to be picked up is engaged and picked up.

22. A gripper head according to claim 21, wherein each push-off element is connected with its respective gripper so as to be downwardly slideable.

23. A gripper head according to claim 21, wherein the push-off element at its upper end is further pivotably connected for engaging and picking up a next sub-adjacent tray upon sliding out and pivoting of the push-off element.

24. A gripper head for unstacking a stack of trays, each tray loaded with eggs comprising;

a holder frame positionable over the stack, the holder frame having a matrix of suction heads, at least two oppositely arranged grippers connected to a carrier unit and extending downwardly therefrom to engage edges of the uppermost tray, at least one spacer fixed to the holder frame and extending through a hole in the carrier unit, permitting the spacer to move vertically relative to the carrier unit, and including at least one support rod fixed to and extending downwardly from the holder frame, parallel to at least one spacer, to engage the edge of the uppermost tray during pick-up of the uppermost tray.

25. A gripper head according to claim 24, wherein when the uppermost tray is skewed from the horizontal because of non-uniformed sized eggs in the stack, the carrier unit and the grippers are moveable to permit the grippers to grip the edges of the skewed uppermost tray.

26. A gripper head according to claim 24, including a second carrier unit above the said carrier unit, at least one second spacer fixed to the said carrier unit and passing through a hole to the second carrier unit so as to be moveable vertically relative to the second carrier unit.

27. A gripper head according to claim 24, including a mast above and operatively engageable with the carrier unit to lift and lower the carrier unit and the holder frame.

28. A gripper head according to claim 24, including push-off elements on each gripper for pushing off a tray below the uppermost tray during pick-up, whereby only the uppermost tray is picked up.

29. A gripper head according to claim 28, wherein the push-off element is connected with a gripper so as to be substantially downwardly slidable.

30. A gripper head according to claim 28, wherein the push-off element is at its upper end further pivotably connected for engaging and picking up the tray below the uppermost tray upon sliding out and pivoting of the push-off element.

* * * * *